Patented July 24, 1934

1,967,686

UNITED STATES PATENT OFFICE 1,967,686

HALIDE-MERCURI NITRO-CRESOLS

George W. Raiziss, Philadelphia, Pa., assignor to Abbott Laboratories, North Chicago, Ill., a corporation of Illinois No Drawing. Application January 26, 1933, Serial No. 653,670

4 Claims. (Cl. 260—13)

My invention relates to pharmaceuticals, and has to do more particularly with substances which are especially adapted for use as bactericides in the treatment of various infectious diseases of the human organism.

I have made the discovery that the halide-mercuri derivatives of nitro cresols possess great efficacy in the treatment of infectious diseases and, furthermore, are soluble in organic solvents, such as alcohol, ether, acetone, etc., as well as in animal and vegetable oils and fats. This solubility in oleaginous substances makes such a product extremely useful as a pharmaceutical and easy to administer.

This application is in part a continuation of my co-pending application, Serial No. 442,460, filed April 7, 1930, which discloses various halide-mercuri derivatives of nitro-cresols together with methods of making the same, and particularly 2-chloro-mercuri-3-nitro-ortho cresol.

The following examples illustrate preferred embodiments of my invention:—

Example

One hundred grams of anhydro-hydroxy-mercuri-4-nitro-ortho-cresol are dissolved in 4 liters of boiling distilled water with the aid of 55 cc. of 40 per cent sodium hydroxide solution. After cooling the clear solution, the chloro derivative is precipitated by the addition of hydrochloric acid, using Congo red test paper. The precipitate is filtered, washed with distilled water until free from chlorides, and dried. This product, chloro-mercuri-1-hydroxy-3-nitro-6-methyl-benzene may be represented:

(1) 

I have also produced the following isomeric compounds, varying the above-described procedure only to the extent that I use as a starting material the appropriate isomeric anhydro-hydroxy-mercuri-nitro-cresol: Chloro-mercuri-1-hydroxy-2-nitro-6-methyl-benzene, which may be represented:

(2) 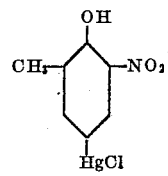

Chloro-mercuri-1-hydroxy-4-nitro-5-methyl-benzene, which may be represented:

(3) 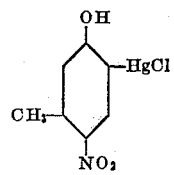

Chloro-mercuri-1-hydroxy-2-nitro-4-methyl-benzene, which may be represented:

(4) 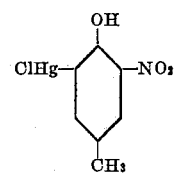

Chloro-mercuri-1-hydroxy-2-nitro-3-methyl-benzene, which may be represented:

(5) 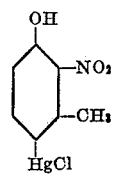

As stated above, these examples are given merely by way of illustration and, therefore, various changes will doubtless suggest themselves to those skilled in the art, without departing from the spirit of my invention. Hence, I wish to be limited only to the extent indicated in the appended claims, which are to be interpreted as broadly as the state of the art will permit.

I claim as my invention:

1. As a pharmaceutical, a halide-mercuri-nitro-cresol.

2. As a pharmaceutical, chloro-mercuri-1-hydroxy-3-nitro-6-methyl-benzene, which may be represented by the formula:
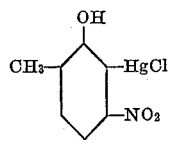
3. As a pharmaceutical, chloro-mercuri-1-hydroxy-2-nitro-6-methyl-benzene, which may be represented by the formula:
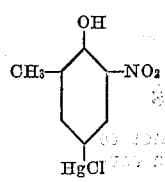
4. As a pharmaceutical, chloro-mercuri-1-hydroxy-2-nitro-4-methyl-benzene, which may be represented by the formula:
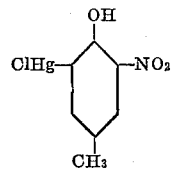
GEORGE W. RAIZISS.